May 23, 1933.  C. E. McGUIRE  1,910,622

AIR SCREW

Filed Feb. 9, 1932

Inventor

C. E. McGuire.

Patented May 23, 1933

1,910,622

UNITED STATES PATENT OFFICE

CECIL E. McGUIRE, OF DOUGLAS, ARIZONA

AIR SCREW

Application filed February 9, 1932. Serial No. 591,787.

This invention relates to an improvement on an air screw for an aircraft of the helicopter type and is an improvement on the lifting screws described in my patent specification, Serial No. 490,242, filed October 21, 1930.

The object of this improvement is to provide an air screw of high aspect ratio to improve its aerodynamic efficiency.

A further object is to provide a variable pitch air screw of high aspect ratio which will not incur structural difficulties.

A still further object is to provide a variable pitch air screw of which aspect ratio which will have sufficient structural strength, and will still be light enough in weight to make it satisfactory for aeronautical purposes.

A still further object is to provide an air screw which will operate in varying wind conditions without chatter or vibration.

In my previous design it was necessary to use a relatively short and thick airfoil on my screws to enable me to inclose a tubular beam within the airfoil of sufficient strength to withstand the external forces on the airfoil. This arrangement proved inefficient and otherwise unsatisfactory, as all the flutter and vibration of the screws in a rigid construction would be transmitted into the body of the aircraft.

The only features of my previous patent which I have incorporated in this improvement is the flexible steel cable connecting the two opposing airfoils to balance their centrifugal force, and the method of swiveling the airfoils around the tubular beam to control their pitch is similar. The steel cable has another function to perform in this design however, in addition to supporting the centrifugal force of the airfoils it must bend as the airfoils deflect from a line normal to their supporting beam, when the screw is set at a positive pitch, or to produce a lifting force, the wind pressure on the airfoils will cause them to deflect upward until the lifting force is balanced by the centrifugal force, and since the steel cable is acting in a direction normal to the resultant of these two forces, it is in reality supporting the lifting force of the screws as well as their centrifugal force; so that there is very little load on the universal joints, and their principal function is to hold the airfoils in their proper position with relation to their supporting beam and to provide a flexible connection to the controls so that the pitch of the airfoils may be varied while they are at the same time free to deflect in any direction.

With the above and other objects in view the invention consists in certain novel details of construction and combination of parts hereinafter fully described and claimed, it being understood that various modifications may be resorted to within the scope of the appended claims without departing from the spirit or sacrificing any of the advantages of the invention.

In the accompanying drawing forming part of this specification,

Fig. 1 is a plan view of the air screw, showing in dotted lines the airfoils deflected forward or backward to assume a neutral position between the torque load on the screw and the centrifugal force of rotation, to eliminate any bending moments in the airfoils.

Fig. 2 is a half sectional view and half elevation of the center portion of the screw, showing the flexible steel cable for supporting the centrifugal force of the airfoils, as well as the external forces on them; the universal joint positions the inner end of the airfoils and forms a connection to the pitch controls, and a cantilevered spring which supports the dead weight of the airfoil when it is at rest, and the dotted lines indicate the angular position the airfoils may take to assume a neutral position between the wind forces on them and their centrifugal force.

Figure 1:
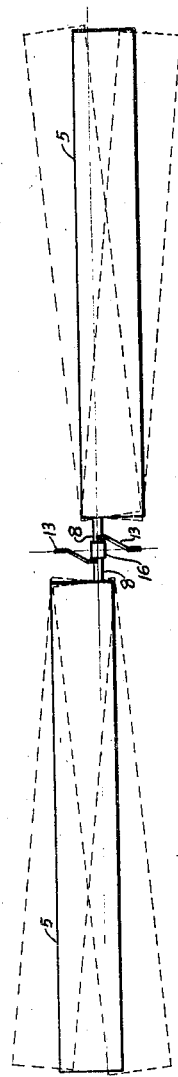
Figure 2:
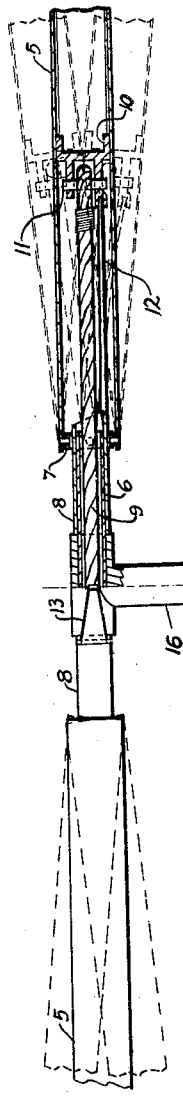
Figure 3:
Fig. 3 is a cross section of the airfoil at the universal joint which positions the inner end of the airfoil.

Referring now to the drawing in which like characters of reference designate similar parts in the various views, 5 designates the screw blades or airfoils, which are mounted on a short tubular beam 6 through universal joint 7 and sleeve 8, Fig. 2; sleeve 8 rotates about beam 6 rotating airfoil 5 to alter its pitch and twisting flexible steel cable 9; sleeve 8 and airfoil 5 are flexibly connected by universal joint 7; to airfoil 5 is attached rib 10, to which cable 9 is attached by pin 11 which passes through a loop in the end of cable 9. Attached to sleeve 8 is a cantilevered spring 12 which will support the weight of the airfoils when the screw is at rest or turning too slow for their centrifugal force to support their weight, to prevent them from drooping down and striking obstructions, but which will deflect in any direction with very little strain on the airfoils and allow them to assume a neutral position between the external forces on the airfoil and their centrifugal force to eliminate any appreciable bending moment on the airfoils. Airfoils 5 will be a recognized airfoil as to camber, and can be made very light in construction, needing very little internal bracing due to the absence of bending moments in their structure.

Figure 4:
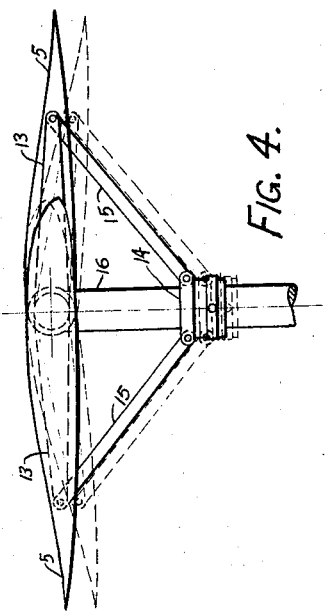
Fig. 4 is an end view of the screw showing in dotted lines the method of altering the pitch of the screws.

To sleeve 8 is also attached lever 13 which in turn is connected to sliding yoke 14 in Fig. 4 by connecting rods 15; yoke 14 will slide up or down on axle 16 to alter the pitch of the screw as shown in dotted lines in Fig. 4; yoke 14 will be operated by a control arrangement similar to that which was used in my previous patent application, Serial No. 490,242, filed Oct. 21, 1930.

From the above description it is thought that the construction and operation of the invention will be clearly understood without further explanation.

Having thus described the invention, I claim:

1. In an aircraft, an air screw including a short tubular beam, airfoils swiveled on the ends of the beam through a universal joint, a steel cable passing through the beam and connected to said airfoils for equalizing the thrust as well as resisting the external forces on the airfoils, and means for varying the pitch of said airfoils on the beam.

2. In an aircraft, an air screw comprising a short tubular beam, an axle secured to the beam for revolving the beam, opposing airfoils flexibly connected to a rotatable sleeve on the ends of the beam, a cable passing through the beam and connecting said airfoils together, and a sliding yoke on said axle operatively connected to a lever on the rotatable sleeve for changing the pitch angle of said airfoils.

3. In an aircraft, an air screw including a short tubular beam, opposing airfoils flexibly connected to rotatable sleeves on the end of said beam, cantilevered springs attached to the said sleeves and supporting the dead weight of said airfoils when said airfoils are at rest and to prevent them from drooping down and striking obstructions, an axle secured to substantially the center point of the beam for rotating the beam, a steel cable loosely passing through said beam and securely attached at the ends to said airfoils for equalizing the centrifugal thrust of said airfoils and for transmitting the lifting force of said airfoils to said beam.

4. In an aircraft, an air screw including a short tubular beam, airfoils flexibly connected to swivel mountings on the ends of said beam at substantially the center of pressure of said airfoils, and a cable housed within the airfoils and said beam, and securely attached at the ends to the airfoils for equalizing the centrifugal thrust of, and resisting the external forces on said airfoils.

5. In an aircraft, an airscrew comprising a short tubular beam, a steel cable passing through said beam, airfoils of substantially identical structure as to size camber and construction, flexibly connected to a swivel mounting on the ends of said beam, a rib secured within the airfoils provided with suitable means of connecting said rib to said cable for transmitting the combined centrifugal thrust and lifting force of the airfoils to the cable to equalize the forces of the opposing airfoils.

6. In an aircraft, an air screw comprising a tubular beam, an axle attached to said beam for rotating said beam, rotatable sleeves on the ends of said beam with universal joints around their outer ends, airfoils with their inner ends attached to said universal joints so that said airfoils may deflect about this joint to assume a neutral position between the centrifugal force of and the external forces on said airfoils to eliminate bending stresses in said airfoils, a cable passing through said beam and terminally connected to said airfoils for equalizing the forces imposed by the opposing airfoils, means of supporting said airfoils when screw is at rest.

C. E. McGUIRE.